(12) United States Patent
Clark

(10) Patent No.: US 11,803,102 B1
(45) Date of Patent: Oct. 31, 2023

(54) HOT SHOE TRIGGERABLE FOCUSING LIGHT FOR PHOTOGRAPHY

(71) Applicant: Lloyd D Clark, San Francisco, CA (US)

(72) Inventor: Lloyd D Clark, San Francisco, CA (US)

( * ) Notice: Subject to any disclaimer, the term of this patent is extended or adjusted under 35 U.S.C. 154(b) by 0 days.

(21) Appl. No.: 18/324,968

(22) Filed: May 27, 2023

Related U.S. Application Data

(60) Provisional application No. 63/455,235, filed on Mar. 28, 2023.

(51) Int. Cl.
*G03B 15/04* (2021.01)

(52) U.S. Cl.
CPC .................. *G03B 15/0421* (2013.01)

(58) Field of Classification Search
CPC .... G03B 15/0421; G03B 15/02; G03B 15/03; G03B 15/0426
See application file for complete search history.

(56) References Cited

U.S. PATENT DOCUMENTS

| | | | |
|---|---|---|---|
| 2,542,311 A | 2/1951 | Carlson | |
| 4,201,434 A * | 5/1980 | Tureck | G03B 15/05 362/11 |
| 4,652,108 A * | 3/1987 | Lida | G03B 15/05 396/129 |
| 5,142,299 A | 8/1992 | Braun | |
| 6,948,823 B2 | 8/2005 | Pohlert et al. | |
| 7,429,117 B2 | 8/2008 | Pohlert et al. | |
| 2008/0298792 A1* | 12/2008 | Clark | H04N 23/66 396/56 |
| 2019/0025671 A1* | 1/2019 | Peterson | G03B 15/07 |

OTHER PUBLICATIONS

Screen captures from YouTube video clip entitled "Spending the Day With a Food Photographer," 6 pages, uploaded on Feb. 26, 2017 by user Tommy Reynolds. Retrieved from Internet: <https://www.youtube.com/watch?v=FU9RX6I8dF4>.*

* cited by examiner

*Primary Examiner* — Christopher E Mahoney

(57) ABSTRACT

An illumination system for photography comprises at least a normally unlit pulsed light source (PLS) (112) with first and second electrical conduits (108, 110), a normally lit continuous light source (CLS) (300) with first and second electrical conduits (308, 310), and a hot shoe (104) with first and second electrical conduits, that is connected to a camera (100). The first conduits of all three components (112, 300, 100) are electrically connected together and the second conduits of all three components (112, 300, 100) are separately electrically connected together. When camera (100) is actuated, a switch closure from camera (100) actuates continuous light source (300), causing it to cease emitting light, and also actuates pulsed light source (112), causing it to briefly emit light, whereby both sources emit light at different times, thereby providing focus lighting while preventing light interference by CLS (300) during exposure of a subject by PLS (112).

10 Claims, 3 Drawing Sheets

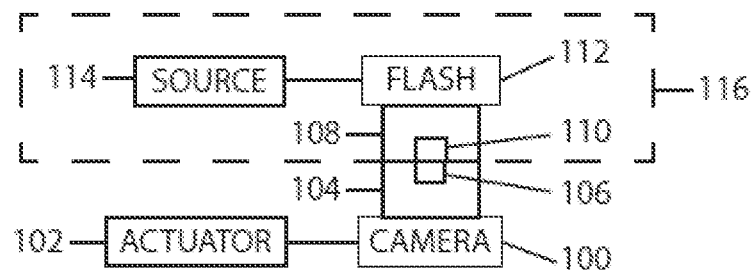
Fig. 1--Prior Art
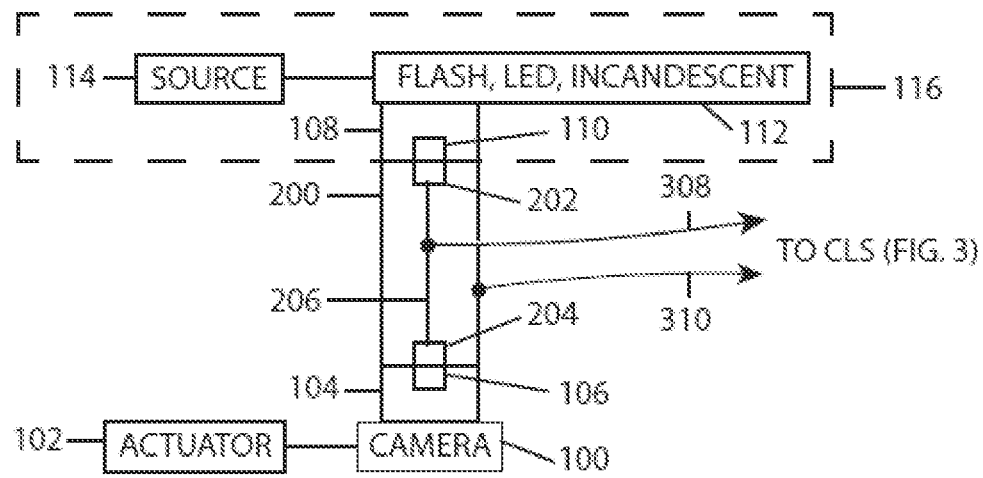
Fig. 2
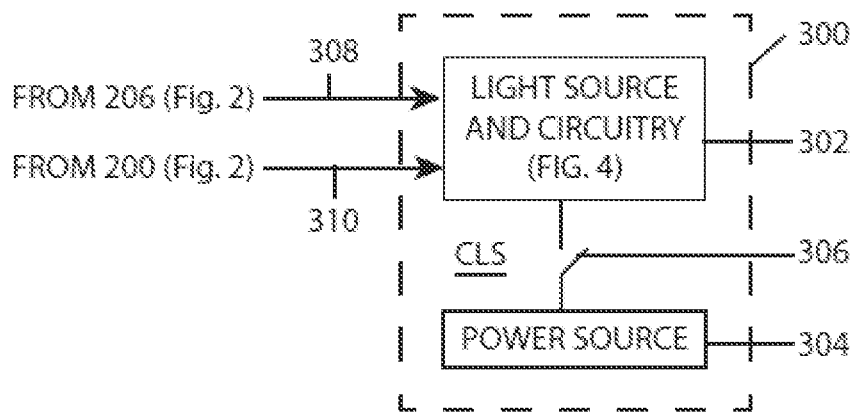
Fig. 3

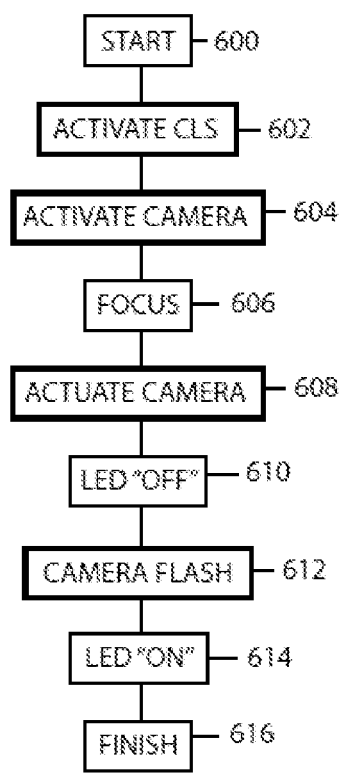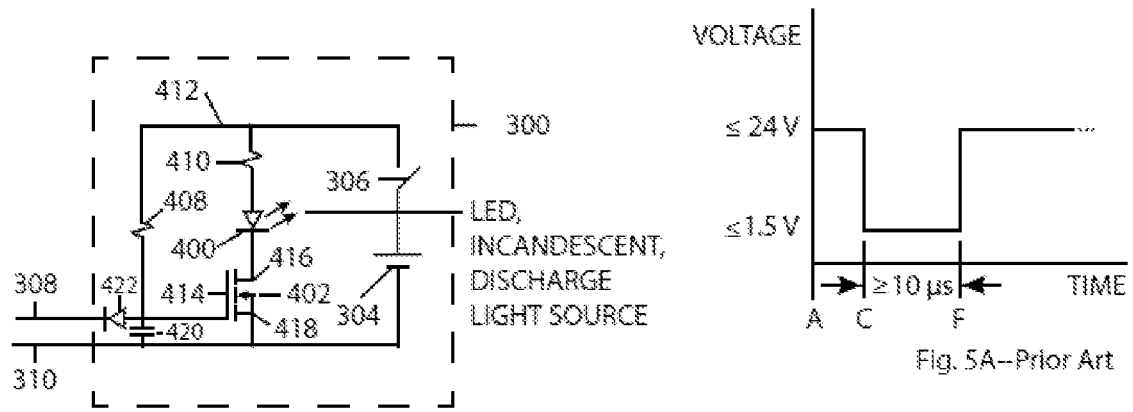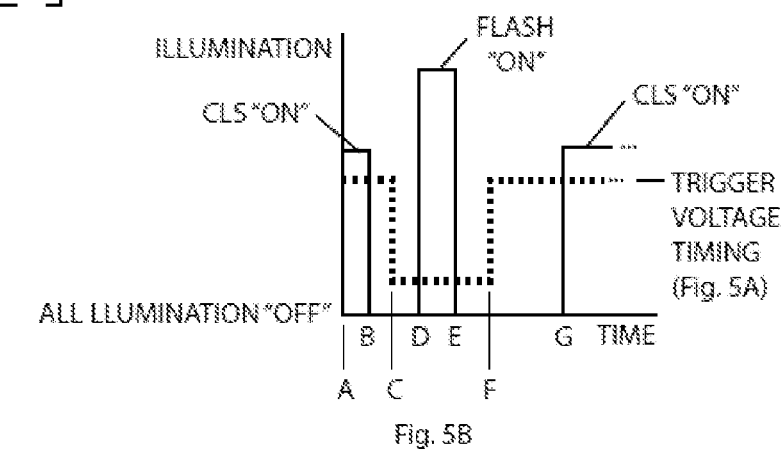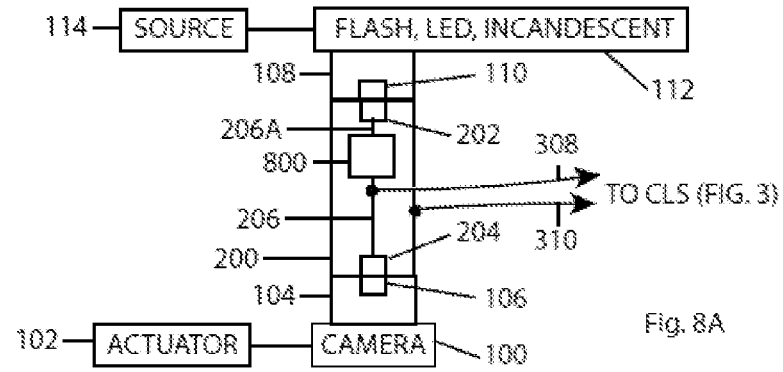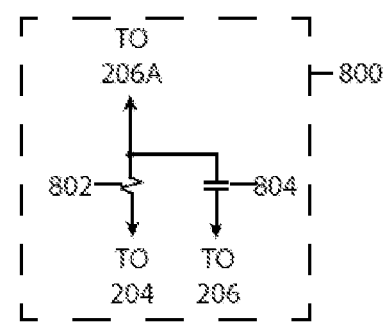

HOT SHOE TRIGGERABLE FOCUSING LIGHT FOR PHOTOGRAPHY

CROSS-REFERENCE TO RELATED APPLICATIONS

This application claims priority of my provisional patent application, Ser. No. 63/455,235, filed 28 Mar. 2023.

BACKGROUND—Prior Art

Illumination of a photographic subject often comprises a plurality of lighting types.

A continuous light source (CLS) is used for focusing and modeling prior to recordation of an image and then a pulsed light source (PLS), such as a gaseous discharge flash or a light-emitting diode, is used for the actual acquisition and recordation of an image of a subject followed by subsequent storing of the image in photographic film or digital memory.

A CLS is distinct and not part of an automatic focusing feature of a camera. A CLS is used during framing of a subject within an image area, modeling (arranging) of a subject, and focusing of an image containing a subject. A photographer observes these actions through a lens, a translucent frosted screen or a digital display, all in well-known fashion. The intensity of a CLS is sufficient for these actions yet not blinding to the photographer.

Acquisition and recordation of an image of a subject commences when a photographer, or a proxy such as a timer or remote control, simultaneously actuates a camera and a PLS. The camera is prepared to receive and record an image of a subject, the PLS briefly illuminates the subject and the resulting image is recorded. A PLS is used for well-known reasons, including stopping motion of a subject and increasing the range of intensity in the recorded image.

In many cases, the CLS remains actuated, i.e., energized and emitting light, during recordation of an image because the intensity of the PLS is far greater than that of the CLS at the subject and therefore adds little appreciable light, or it is impractical or undesirable to deactivate, i.e., turn "OFF" the CLS during acquisition of an image. This can happen when a CLS emits light from an incandescent source since such a source takes a period of time on the order of seconds to cool and become dark.

BACKGROUND—Prior Art—Macro Photography

In macro photography the distance between a camera lens and a subject is often small, on the order of a few centimeters. At these distances, the depth of field of a suitable close-up lens is very small, on the order of a few millimeters. In order to record a particular area on a subject, focusing is often performed manually instead of using a camera's automatic focusing feature. Under these circumstances, a CLS is useful for focusing and framing of an image but can interfere with optimal lighting of a subject when a PLS is used. For example, a CLS can introduce specular reflections, shadows or other unwanted lighting effects if it is actuated during acquisition and recordation of an image.

BACKGROUND—Prior-Art References

The following is a list of some possibly relevant prior art that shows materials and methods used in making photographic lighting equipment. Following this list I provide a discussion of these references.

| Patent | Kind Code | Issue Date | Patentee |
| --- | --- | --- | --- |
| 2,542,311 | A | 1951 Feb. 20 | Carlson |
| 5,142,299 | A | 1992 Aug. 25 | Braun |
| 6,948,823 | B2 | 2005 Aug. 27 | Pohlert et al. |
| 7,429,117 | B2 | 2008 Aug. 30 | Pohlert et al. |

In U.S. Pat. No. 2,542,311, Carlson teaches a photographic spotlight combining a flashtube and a continuous, incandescent modeling lamp. The continuous modeling lamp is used to arrange a subject and the flashtube is used during acquisition of an image of the subject. The modeling lamp and the flashtube present approximately equal light intensities at a subject. There is no mention of extinguishing the modeling lamp while the flashtube is used. Carlson's combination of lamps would be unsuitable for photographing rapidly moving subjects because an incandescent modeling lamp having an intensity similar to that of a flashtube would take a period of time on the order of tenths of a second to fully extinguish.

In U.S. Pat. No. 5,142,299, Braun teaches a hand held system for close-range underwater photography composing and focusing. Two continuous light sources, flashlights (Braun, FIG. 1, 100, 200) emit beams of light that converge at an intersection 300 that coincides with a point of focus F of the camera lenses 25, 25A. The beam intersection enables focusing and framing without requiring an operator to look through a viewfinder 32. A flash unit 27 is attached to a camera system 23 by a bracket 29. When an operator actuates a shutter release 31, the flash unit 27 is actuated and briefly emits a pulse of light. Instead of triggering an external flash via a hot shoe, the Nikonos SB 102 bracket and strobe system described in the Braun patent is electrically connected to camera system 23 by a cable (not shown in the Braun patent), not a hot shoe. The sole mention of a shoe 99 in the Braun patent is for use as a mounting bracket for support member 95.

In column 7, lines 20-27, Braun states: "Note also that light sources 101 and 102 are sufficiently bright to allow focusing and composing, but are considerably dimmer than the light produced by the strobe-flash unit. Typically, the difference is at least a factor of ten. In this way, the light spots caused by the present invention are washed out by the strobe flash so that the photograph does not show a light spot where light beams 101 and 201 were present on the subject." While the foregoing is true for underwater photography, it is not necessarily true for photography wherein a diffuser is used between a flash and a subject in order to spread light from a flash and provide even illumination of and around a subject. A diffuser decreases light intensity at each point on a subject, thereby reducing the difference in intensity between a continuous focusing light and a pulsed flash. There is no mention of extinguishing a continuous light source while recording an image using a pulsed light source.

In U.S. Pat No. 6,948,823 B2, Pohlert et al. teach a lighting effects system comprising an arrangement of lamp elements on a panel or frame. A controller modulates the intensity, frequency, and duration of individual light sources on the panel. A term "thermal shoe" is used to identify a heat sink arrangement on the bottom surface of an LED, 3103 in FIG. 31. A "hot shoe" is not used in this patent. The term "focus" is used to describe the spread of light emanating from lamp elements, rather than adjusting the focus of a lens while using a focusing light source.

In U.S. 7,429,117 B2, Pohlert et al. teach a light panel and a plurality of light sources, such as LEDs, that are secured to the panel frame. A controller modulates the intensity, frequency, and duration of individual light sources on the panel. A term "thermal shoe" is used to identify a heat sink arrangement on the bottom surface of an LED, 3103 in FIG. 31. A term "camera shoe" is used to identify a non-electrically-functional mounting member for securing a mounting pin, 5250 in FIG. 52B, of lighting apparatus 4700, FIG. 52A. Neither of these terms refers to a "hot shoe" that is responsive to a shorting of conduits that occur with actuation of a camera, as used herein. Neither of the Pohlert patents teach using a continuous light source for focusing and a pulsed light source for recordation of an image.

SUMMARY

Accordingly I have discovered apparatus and signal-responsive controls that comprise a CLS that is activated during focusing, modeling, and framing of an image and then automatically deactivated while a PLS is used during acquisition and recording of an image of a subject. My apparatus is suitable for use as an add-on accessory for a wide range of cameras with hot shoes. It is also suitable for inclusion in flash control systems. My apparatus overcomes drawbacks of prior-art systems at least by providing compatibility with existing flash adapters, enabling rapid image capture of subjects, and eliminating interference between a continuously operating modeling light and a pulsed flash unit.

BRIEF DESCRIPTION OF DRAWINGS

FIG. 1 shows an assemblage comprising a camera and a flash unit using hot shoes, according to prior art.

FIG. 2 shows the addition of a hot shoe adapter according to one aspect of an embodiment.

FIG. 3 shows a continuous light source according to one aspect of an embodiment.

FIG. 4 shows a schematic electrical diagram of one aspect of the continuous light source of FIG. 3.

FIG. 5A shows a timing diagram of a prior art flash control signal.

FIG. 5B shows a timing diagram of actuation of a continuous light source according to one aspect of an embodiment.

FIG. 6 is a block diagram showing the steps in the operation of an embodiment.

FIG. 8A shows an alternative aspect of an embodiment.
FIG. 8B shows an alternative delay circuit.

DRAWING FIGURE REFERENCE NUMERALS

Figure 7A:
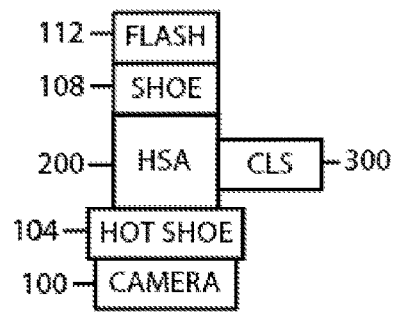
FIGS. 7A through 7F show various alternative arrangements of components according to aspects of the present disclosure.

100 Camera
102 Actuator
104 Hot shoe, conduit
106 Contact
108 Shoe, conduit
110 Contact
112 Pulsed light source (flash, LED, other)
114 Source
200 Adapter
202 Contact
204 Contact
206 Conduit
206A Conduit
300 Continuous light source
302 Light source
304 Source
306 Switch
308 Conduit
310 Conduit
400 LED or other continuous light source such as incandescent, electrical discharge, other
402 Transistor
408 Resistor
410 Resistor
412 Conduit
414 Gate
416 Drain
418 Source
420 Capacitor
422 Diode
800 Delay circuit
802 Resistor
804 Capacitor

DETAILED DESCRIPTION

FIRST EMBODIMENT—Description FIGS. 1 Through 4

In one embodiment, a CLS is self-powered by an electrical source and comprises in part a control circuit and at least one well-known "hot shoe" mount.

A hot shoe comprises a first electrical conduit having a well-known and widely-used male or female, slidably engageable and interlocking shape and a second electrical conduit that is electrically insulated from the first electrical conduit. When a female shoe is engaged with a male shoe, the first electrical conduit on the male shoe is in physical and electrical contact with the first electrical conduit of the female shoe and the second electrical conduits on each of the male and female shoes are in physical and electrical contact. Thus when a male shoe is engaged with a female shoe, the first and second conduits are capable of completing an electrical circuit.

FIG. 1 shows a prior-art assembly of components comprising a camera 100 having an internal power source such as a battery (not shown), an actuator 102, an electrically conductive male shoe 104 with an isolated electrical contact 106 that is briefly electrically connected to shoe 104 when camera 100 is actuated, an accessory female shoe 108 with a contact 110 that is electrically connected to an accessory PLS 112 and electrically engaged with contact 106 in shoe 104, and a power source 114 that is arranged to activate PLS 112. Shoes 104 and 108 are in electrical and physical contact with one-another, as described above. PLS 112 is normally contained in a housing 116 that includes or is contiguous with at least hot shoe 108, flash 112, and source 114.

When a subject (not shown) is to be photographed, source 114 activates flash 112 and camera 100 is activated in preparation for recordation of an image of a subject. When camera 100 is actuated by actuator 102, camera 100 prepares for recordation and then briefly electrically connects electrode 104 and contact 106. Since contact 110 is in contact with contact 106 and electrode 104 is in contact with electrode 108, an electrical signal resulting from this contacting is communicated from camera 100 to PLS 112, thereby actuating PLS 112 whereby a subject is illuminated for recordation by camera 100.

FIG. 2 shows one aspect of an embodiment. In this aspect, a hot shoe adapter (HSA) 200 is slidably interposed and secured between shoe 104 on camera 100 and shoe 108 on PLS 112. At least a portion of HSA 200 is electrically conductive, thereby comprising an electrical terminal. Thus HSA 200 is joined in electrical contact with shoes 104 and 108.

HSA 200 further includes a first contact 204 that is electrically insulated from the remainder of HSA 200 and is in electrical contact with terminal 106 of shoe 104. A second contact 202, electrically insulated from the remainder of HSA 200, is in electrical communication with contact 110 of shoe 108. Contacts 202 and 204 are also in electrical contact with one-another via a conduit 206. Conduit 206 is also electrically insulated from the remainder of HSA 200.

The addition of HSA 200 itself has no practical effect on the operation of camera 100 and PLS 112 since shoes 104 and 108 are in electrical contact with one-another and contacts 106 and 110 are also in electrical contact with one-another. Thus when HSA 200 is interposed between shoes 104 and 108, camera 100 is able to operate PLS 112 as in the prior art.

FIG. 3 shows the addition of CLS 300 to the apparatus of FIG. 2. CLS 300 comprises a light source 302 and associated circuitry (FIG. 4), a power source 304, and a switch 306 having first and second terminals. A first terminal of switch 306 is connected to light source 302 and a second terminal of switch 306 is connected to power source 304 so that when switch 306 is closed, light source 302 is electrically connected to and activated (energized) by power source 304.

Light source 302 further includes electrical conduits 308 and 310. Conduit 308 is connected to conduit 206 and conduit 310 is electrically connected to terminal 200 of HSA 200 (FIG. 2).

FIG. 4 is a schematic electrical diagram of CLS 300 according to one aspect of the present embodiment. CLS 300 comprises a light-emitting diode (LED) 400 such as part number GW CSSRM3.PM-N5N8-XX57-1 from ams-Osram AG of Premstaetten, Austria, a transistor 402, such as a well-known MOSFET type having part number SQA446CEJW-T1_GE3 manufactured by Vishay Semiconductor of Malvern, PA, USA. CLS 300 also includes a power source 304, such as a plurality of standard AA-size batteries or any of a number of suitable batteries such as a part number 2CR-5MPA photo battery made by Panasonic Company of Japan, a toggle switch 306 (also shown in FIG. 3), a first resistor 408, a second resistor 410, a capacitor 420 and a diode 422. Transistor 402 comprises a gate electrode 414, a drain electrode 416, and a source electrode 418, as is well known to those skilled in the art of electronics. Resistors 408 and 410 are standard carbon or metal film resistors and switch 306 is a standard pushbutton or toggle switch of capacity about 1 ampere. In one aspect, capacitor 420 is a standard ceramic or film type with a capacitance of 0.1 microfarad and resistor 408 has a value of 1 megohm and a rating of one-quarter watt. Diode 422 is a standard switching type such as part number 1N4148.

In an alternative aspect of the present embodiment, LED 400 is replaced by a light source having an incandescent filament or an electrical discharge lamp.

FIRST EMBODIMENT—Operation FIGS. 4, 5A, 5B, and 6

Official Standard, Prior Art, FIG. 5A—When camera 100 is actuated, hot shoe 104 sends an actuating electrical signal to PLS 112 via adapter 200 (time C-F). The ISO (International Organization for Standardization) Standard 10330 for hot shoes requires that the voltage difference supplied to camera 100 by PLS 112 have a non-actuating direct current value between terminals 104 and 106 that is less than or equal to 24 volts (times A-C and after F) and more than 1.5 volts when shoe 104 is not actuated. When hot shoe 104 is actuated, the voltage between terminals 104 and 106 must be less than or equal to 1.5 volts for at least 10 microseconds (time C-F), as shown in FIG. 5A. Thus when actuated, camera 100 provides an internal switch closure (not shown) between terminals 104 and 106 of hot shoe 104 (FIGS. 1 and 2), thereby simultaneously actuating flash 112 and CLS 300.

Operation of Present Embodiment, FIGS. 4 and 5B—When switch 306 (FIG. 4) is closed, voltage from a positive terminal of battery 304 is applied to the upper terminals of resistors 408 and 410 via a conduit 412. In normal use, gate 414 of transistor 402 draws almost no current, typically nanoamperes, and therefore is held at a positive potential by connection to the lower terminal of resistor 408, thereby normally placing transistor 402 into an "ON" state and charging capacitor 420 to a voltage that is equal to the potential of battery 304, minus a negligible voltage drop through resistor 408. A typical resistance value for resistor 408 ranges between tens of thousands of ohms to one megohm. In this "ON" state, transistor 402 assumes a very low resistance to current between drain 416 and source 418. A typical value of this resistance is on the order of milliohms. When transistor 402 is in the "ON" state, current flows from the positive terminal of battery 304, through closed switch 306, conduit 412, resistor 410, LED 400, and transistor 402, and returns to the negative terminal of battery 304 via conduit 310, thereby causing LED 400 to emit light (time A-B). This can be the light that is used for focusing camera 100 prior to recordation of an image. The value of resistor 410 is chosen so as to limit current flowing through LED 400 to a safe value, typically 0.5 Amperes. A typical value of resistor 410 is 10 ohms. A typical voltage value of battery 304 is between 3 and 10 volts.

When switch 306 is closed, CLS 300 is activated and LED 400 emits light (time A-B, FIG. 5B). When camera 100 is actuated for recordation of an image, conduits 308 and 310 are electrically connected together for a period of time that is greater than 10 μs (time B-G). During this time, current flows from resistor 408 and capacitor 420 and through diode 422, reducing the potential on gate 414 and across capacitor 420 to a value that is less than or equal to about 2 volts, accounting for a well-known voltage drop of 0.5 volts across diode 422. During the time interval B-G, the voltage applied to gate 414 with reference to the voltage on conduit 310 is less than 2 volts for at least 10 microseconds (time C-F). Transistor 402 is selected so that a potential difference of 2 volts or less between gate 416 and source 418 causes transistor 402 to assume an "OFF" state, i.e., a state in which no current passes through transistor 402, LED 400, and resistor 410. When transistor 402 is in an "OFF" state (time B-G), no current flows through LED 400 and LED 400 emits no light. During time C-F, PLS 112 (FIG. 2) is actuated and emits light for recordation of a subject's image. After the camera's switch closure of ≥10 μs has elapsed (time F), conduits 308 and 310 are no longer connected together and no current flows through diode 422. This enables current flowing through resistor 408 to charge capacitor 420, thereby raising the electrical potential of gate 414 to a value above 2 volts and placing transistor 402 into an "ON" state, causing LED 400 to emit light again (time G). The values of resistance of resistor 408 and capacitance of capacitor 420 are selected based on a desired delay time for return to an "ON", or emissive, state of LED 400 (time F-G, see below). If resistor 408 has a value of 1 megohm and capacitor 420 has a value of 0.1 microfarad, transistor 402 will resume an "ON" state approximately 0.1 second after the end of camera 100's nominal 10 μs switch closure pulse. Other time constant values can be used as desired.

FIG. 6 is a block diagram showing operational steps for this aspect of the present embodiment. Prior to the START (block 600), all components in CLS 300 are mechanically and electrically connected and ready for use. HSA 200 is mounted, secured, and connected between shoes 104 and 108 as shown in FIG. 2. Electrical conduit 308 connects conduit 206 to the circuitry in CLS 300 and electrical conduit 310 electrically connects adapter terminal 200 to the circuitry in CLS300 as shown in FIGS. 2 through 4. LED 400 in CLS 300 is directed toward a subject (not shown) to be recorded. CLS 300 is activated by closure of switch 306 (block 602) and LED 400 emits light that is directed at a subject that is to be recorded. Camera 100 is activated and aimed generally at the same subject (block 604). An operator (not shown) arranges camera 100 for a focus operation and commences focusing, i.e., the operator views an image of a subject through a lens, on a digital display, or on a frosted glass and adjusts camera 100 to focus on the subject (block 606). An operator actuates camera 100 via actuator 102 (block 608). The potential difference between terminals 308 and 310 assumes a value less than or equal to 2 volts, thereby rendering transistor 402 in an "OFF" state and extinguishing illumination from LED 400 (block 610). At approximately the same time, camera 100 activates flash 112 for recordation via contacts 202 and 204 and HSA 200 (block 612). A short time later, at least 10 microseconds per the ISO standard (FIG. 5A), transistor 402 returns to an "ON" condition and LED 400 again emanates light (block 614). The series of events in FIG. 6 is complete (block 616).

ALTERNATIVE ARRANGEMENTS—FIGS. 7A-7F

Figure 7B:
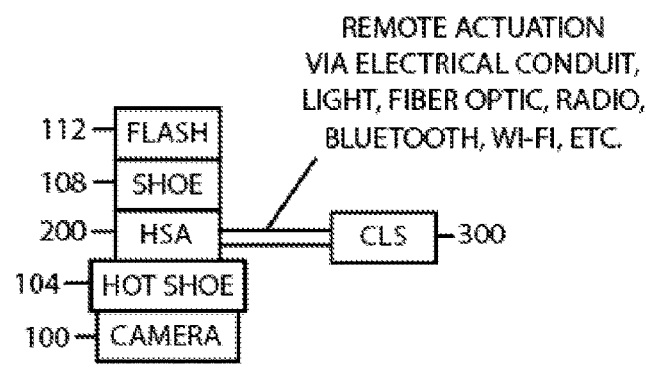
Figure 7C:
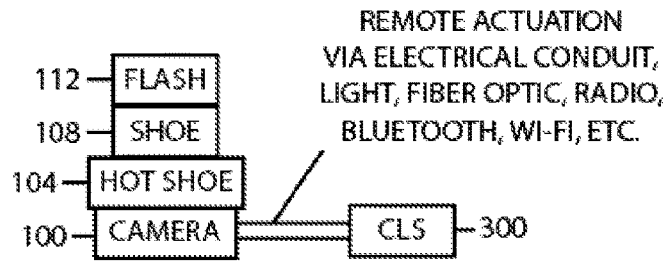
Figure 7D:
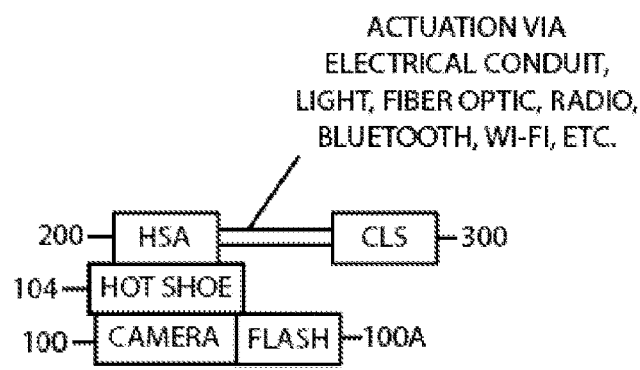
Figure 7E:
Figure 7F:
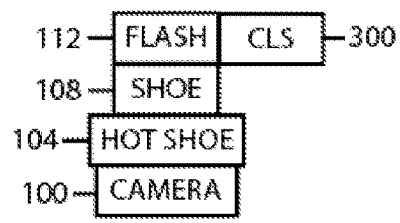

The apparatuses shown in the present disclosure can be arranged and connected in various ways and still meet the stated goal of extinguishing a modeling and focusing light during recordation of an image. FIG. 7A shows an arrangement similar to that shown in FIGS. 2 and 3 except that CLS 300 and HSA 200 are joined together in a single unit. FIG. 7B shows other means of actuation of CLS 300, i.e., via light, fiber optic, radio, Bluetooth, and Wi-Fi (a trademark of the Wi-Fi Alliance that uses parts of the IEEE 802 protocol for wireless communication) in addition to electrical conduits. FIG. 7C shows actuation of CLS 300 by direct connection to internal circuitry of camera 100 using any of the above additional methods. FIG. 7D shows the use of CLS 300 in conjunction with a flash 100A that is built into camera 100. FIG. 7E shows the use of a CLS 300A that is a part of camera 100 such as the camera's own visible focusing light. 7F shows the combination of CLS 300 and flash 112 in a single unit.

ALTERNATIVE ASPECT OF AN EMBODIMENT—FIGS. 5B, 8A and 8B

FIG. 8A shows an alternative aspect of the embodiment shown in FIG. 2. In the event that LED 402 (or an alternative source such as an incandescent or electrical discharge light source) does not extinguish before flash 112 is actuated (time B-D), it is possible for light from LED 402 to be present when flash 112 is actuated for recordation of an image by camera 100. This can happen when transistor 402 has sufficient capacitance between gate 414 and source 418 to slow the transition of conduit 308 from its pre-actuation value, relative to that of conduit 310, to the 2 volts necessary to trigger flash 112 (time B-D). In this case, it is desirable to introduce a time delay in the actuation of flash 112 until LED 402 is fully extinguished (time B-C). A delay in actuation of flash 112 is accomplished by adding a delay device 800 between conduit 206 and contact 202 via a conduit 206A. Delay device 800 can be a 20 microsecond delay, model GB20P0ZXXX, manufactured by Allen Avionics, Inc., of River Grove, IL, U.S.A., for example. Alternatively, delay device 800 can be a resistor-capacitor delay circuit such as the one shown in FIG. 8B. Typical values for resistor 802 and capacitor 804 are 1 megohm and 0.1 microfarad, respectively, for a time delay of 0.1 second, although other values can be used.

SUMMARY RAMIFICATIONS AND SCOPE

I have devised and described a method and apparatus that provides modeling and focusing illumination for use with a camera, that extinguishes the modeling and focusing illumination during recordation of an image by the camera, and then optionally reinstates the modeling and focusing illumination after recordation of the image. This new and unexpected series of events are improvements to the prior art that enable a photographer to have complete control over lighting of a subject during image recordation without interference by a focusing light that may cause specular reflections, shadows, or other unwanted lighting effects. My apparatus is compatible with existing hot shoe flash adapters and can be incorporated within a camera. It can also be incorporated into a flash accessory for mounting on the hot shoe of a camera.

The apparatus and methods enumerated in this disclosure are merely exemplary. Those skilled in the art of photography may see that steps and objects can be added or changed without changing the nature of the disclosure. For example, instead of using hot shoes, wired, Bluetooth, Wi-Fi, and fiber-optic connections between a camera, a CLS, an external flash can be substituted for part or all of the electromechanical connections shown above. The embodiments described herein can be combined in alternate arrangements to accommodate various lighting requirements.

Instead of promptly returning transistor 402 to an "ON" condition and causing LED 400 to return to an emitting state after a flash, circuitry can be added to further delay or even halt the return of transistor 402 to its "ON" state, thereby extinguishing LED 400 for a longer period of time than required by the ISO standard. Instead of a battery, a battery eliminator device such as a plug-in power supply can be used to power CLS 300. Instead of recordation of a single image, a camera can be operated in a well-known Multiple Exposure Mode wherein CLS 300 and PLS 112 operate alternately during capture and recordation of a predetermined number of images. Instead of ceasing to emit light during actuation, CLS 300 can emit light at a reduced intensity that will not interfere with lighting provided by PLS 112.

Thus the scope should be determined by the appended claims and their legal equivalents, and not just by the examples given.

The invention claimed is:
1. A method for photographing a subject, comprising:
   (a) providing a camera with a hot shoe, wherein said hot shoe comprises at least two electrical conduits that are briefly connected together when said camera is actuated for recordation of an image of said subject,

(b) providing a pulsed light source connected to said hot shoe and said two electrical conduits, wherein said pulsed light source activates said electrical conduits,
(c) providing a continuous light source with an actuating circuit, wherein said actuating circuit is connected to said two electrical conduits, and
(d) activating said camera, said pulsed light source, and said continuous light source,
(e) actuating said camera,
whereby when said camera is actuated, said two electrical conduits are briefly connected together, thereby actuating said pulsed light source and causing said pulsed light source to emit light for recordation of said image of said subject by said camera, while extinguishing said continuous light source during said recordation of said image by said camera.

2. The method of claim 1, further including providing a first delay circuit in series with at least one of said conduits that delays actuation of said pulsed light source for a predetermined period of time after said hot shoe on said camera is actuated.

3. The method of claim 1, further including a second delay circuit in said actuating circuit of said continuous light source that delays emission of light from said continuous light source for a predetermined period of time after said pulsed light source has been actuated.

4. The method of claim 1, wherein said continuous light source comprises a light source selected from the group consisting of light-emitting diodes, incandescent light sources, and electrical discharge light sources.

5. The method of claim 1, wherein said continuous light source and said actuating circuit are contiguous with said housing of said pulsed light source.

6. The method of claim 1, further providing means that are contained within said camera and selected from the group consisting of electrical conduit, light, fiber optic, radio, Bluetooth, and Wi-Fi and are arranged to actuate said continuous light source and said pulsed light source when said camera is actuated for recordation of an image.

7. The method of claim 1, further including providing a first delay circuit in series with at least one of said conduits that delays actuation of said pulsed light source for a predetermined period of time after said hot shoe on said camera is actuated,
further including providing a second delay circuit in said actuating circuit of said continuous light source that delays emission of light from said continuous light source for a predetermined period of time after said pulsed light source has been actuated,
wherein said continuous light source comprises a light source selected from the group consisting of light-emitting diodes, incandescent light sources, and electrical discharge light sources, and
further providing a hot shoe adapter between said hot shoe of said camera and said hot shoe of said pulsed light source, wherein said first and said second conduits of said hot shoe of said camera and said hot shoe of said pulsed light source are electrically connected and mechanically engaged by said hot shoe adapter between said hot shoe of said camera and said hot shoe of said pulsed light source.

8. The method of claim 7, wherein said actuating circuit is connected to said electrical conduits on said hot shoe adapter between said hot shoe of said camera and said hot shoe of said pulsed light source via means selected from the group consisting of electrical conduit, light, fiber optic, radio, Bluetooth, and Wi-Fi.

9. A hot shoe triggerable focusing light accessory for a camera, comprising:
a camera with a first hot shoe having at least first and second electrical conduits, wherein said first and said second conduits are electrically connected together when said camera is actuated,
a second hot shoe that is mechanically engaged with and electrically connected to said first hot shoe, wherein said first and said second electrical conduits on said first and said second hot shoes are electrically connected to said first and said second electrical conduits on said first hot shoe, and wherein said second hot shoe further includes a normally-unlit pulsed light source that is contained in a housing and that emits light when said first and said second hot shoes are actuated by said camera,
a normally-lit continuous light source having an actuating circuit that is electrically connected to said first and said second electrical conduits on said first and said second hot shoes, wherein said actuating circuit causes said continuous light source to cease emitting light when said first hot shoe is actuated by said camera,
wherein said continuous light source comprises a light source selected from the group consisting of light-emitting diodes, incandescent light sources, and electrical discharge light sources,
further including a first delay circuit that delays emission of light from said continuous light source for a predetermined period of time after said pulsed light source has been actuated,
further including a second delay circuit in series with at least one of said first and said second electrical conduits between said first and said second hot shoes,
whereby when said first and said second conduits of said first hot shoe are electrically connected together when said camera is actuated, said pulsed light source is arranged to emit light after a time delay introduced by said second delay circuit,
whereby when said camera is actuated, said continuous light source ceases to emit light and said pulsed light source emits light.

10. A system for recordation of an image, comprising:
a first hot shoe on a camera having at least first and second electrical conduits that are briefly connected together when said camera is activated and actuated,
a second hot shoe on a pulsed light source having at least first and second electrical conduits that are connected to said first and said second electrical conduits of said first hot shoe of said camera, wherein when said pulsed light source is energized, a potential difference between said two electrical conduits has a first predetermined value when said camera is activated but not actuated, and a second predetermined value when said camera is activated and actuated, wherein when said camera is actuated said second predetermined value of said potential is present between said two electrical conduits, said pulsed light source is activated and briefly emits light,
a continuous light source selected from the group consisting of light-emitting diodes, incandescent light sources, and electrical discharge light sources, wherein said continuous light source further includes first and second electrical conduits that are connected to said first and said second electrical conduits of said first hot shoe on said camera and said first and said second electrical conduits of said pulsed light source, wherein when said second predetermined value of said potential is present between said two electrical conduits, said continuous light source is actuated and ceases emitting light, wherein said system for recordation of an image further includes a delay circuit with a predetermined delay time that is inserted in series with at least one of said electrical conduits between said first hot shoe on said camera and said second hot shoe on said pulsed light source, whereby when said hot shoe on said camera is actuated, said pulsed light source is actuated after said delay time, whereby said continuous light source is extinguished while said pulsed light source emits light.

* * * * *